United States Patent [19]
Wehrle et al.

[11] Patent Number: 5,624,577
[45] Date of Patent: Apr. 29, 1997

[54] DISPOSAL OF OIL SPILL CLEANUP COLLECTIONS

[75] Inventors: John P. Wehrle, Greenbelt; Eugene C. Fischer, Stevensville; John R. Ness, Reisterstown; Barbara Howell, Arnold, all of Md.

[73] Assignee: The United States of America as represented by the Secretary of the Navy, Washington, D.C.

[21] Appl. No.: 566,224

[22] Filed: Dec. 1, 1995

[51] Int. Cl.⁶ .................................................. C02F 1/02
[52] U.S. Cl. ..................... 210/768; 210/774; 210/776; 210/770; 210/922; 588/205; 95/230; 95/237
[58] Field of Search .................... 210/774, 776, 210/922, 768, 242.3, 770; 588/205; 95/230, 237

[56] References Cited

U.S. PATENT DOCUMENTS 3,663,149  5/1972  Heagler ............................ 210/242
5,057,004  10/1991  McAllister ....................... 210/923

Primary Examiner—Neil McCarthy
Attorney, Agent, or Firm—John Forrest; Jacob Shuster

[57] ABSTRACT

Oil and water continuously collected during an oil spill skimming operation is initially heated for flow through a separator wherein water is separated and discharged into the sea to reduce the water content of a heated oil and water solution fed to a combustion chamber under pressure for continuous in-situ burning interrelated by feedback control with the heating step to provide combustion products, including combustion gas that is cooled and cleansed by scrubbing before discharge to atmosphere, and a slurry of cooled non-gaseous combustion products that are evaporatively dried to form a reduced quantity of carbonaceous solid waste.

11 Claims, 2 Drawing Sheets

DISPOSAL OF OIL SPILL CLEANUP COLLECTIONS

This invention relates in general to oil spill clean up operations, and in particular to the processing of oil spill collections resulting from such operations.

BACKGROUND OF THE INVENTION

The occurrence of major oil spill incidents at sea has required the institution of cleanup operations for removal of resulting oil slicks from the seawater. One well established cleanup operation involves burning of the oil slick in place which often results in release of a significant amount of smoke into the atmosphere creating an air pollution problem. Where in-situ ignition and burning of the oil slick is not feasible, skimming of the oil slick by means of skimmer vessels has been resorted to. The skimmer vessels collect the oil from the oil slick locations with a significant amount of water, such as 9 gallons of water for each gallon of oil recovered. The containment tanks associated with such skimmer vessels are rapidly filled with volumetrically large oil and water collections having relatively small amounts of the oil requiring nevertheless frequent return to shore for off-loading thereby causing interruptions in the cleanup operation during which oil slick spreading occurs. Because of such cleanup interruption difficulty, oil combustion aboard the skimming vessel may be resorted to for a more rapid and continuous cleanup operation. However, such on-board combustion of the collected oil also involves considerable air pollution from in-situ discharge of gas combustion products.

It is therefore an important object of the present invention to provide for more efficient and less polluting combustion and disposal of oil and water collections during a continuous skimming type of oil slick cleanup operation.

SUMMARY OF THE INVENTION

In accordance with the present invention, the oil and water collection received and stored in the barge of a skimmer vessel during a continuous oil slick skimming operation is initially heated to reduce its viscosity and enable it to be pumped under a sufficiently high pressure, such as 3000 psi, through subsequent disposal process steps. The water content of the heated oil and water collection is volumetrically reduced, during a separation step, to less than 30% of the oil and water solution being processed to provide a considerable amount of separated water for in-situ discharge into the sea without environmental pollution. The remaining oil and water solution having a reduced water content is then fed under the aforementioned high pump pressure to a combustion chamber within which it undergoes in-situ burning during a combustion process step interrelated by feedback control with the initial heating step to regulate the heating temperature and the flow rate of the oil and water solution for maintaining continuous combustion without furnace overheating. The resulting combustion products are then cooled below 180° F. before the gaseous portions thereof undergo a scrubbing step for discharge to atmosphere of combustion gas cleansed of solid smoke particles. The smoke particles and other non-gaseous portions of the combustion products are collected after cooling as a slurry fed through an evaporative drying step to form a reduced quantity of solid carbonaceous waste that is eventually unloaded from the skimmer vessel after completion of the cleanup operation.

BRIEF DESCRIPTION OF DRAWING FIGURES

A more complete appreciation of the invention and many of its attendant advantages will be readily appreciated as the same becomes better understood by reference to the following detailed description when considered in connection with the accompanying drawing wherein:

FIG. 1 is a block diagram illustrating the oil spill collection disposal process of the present invention; and FIG. 2 is a somewhat schematic illustration of an apparatus component arrangement in accordance with one embodiment of the invention for performance of the process diagrammed in FIG. 1.

DETAILED DESCRIPTION OF PREFERRED EMBODIMENT

Figure 1:
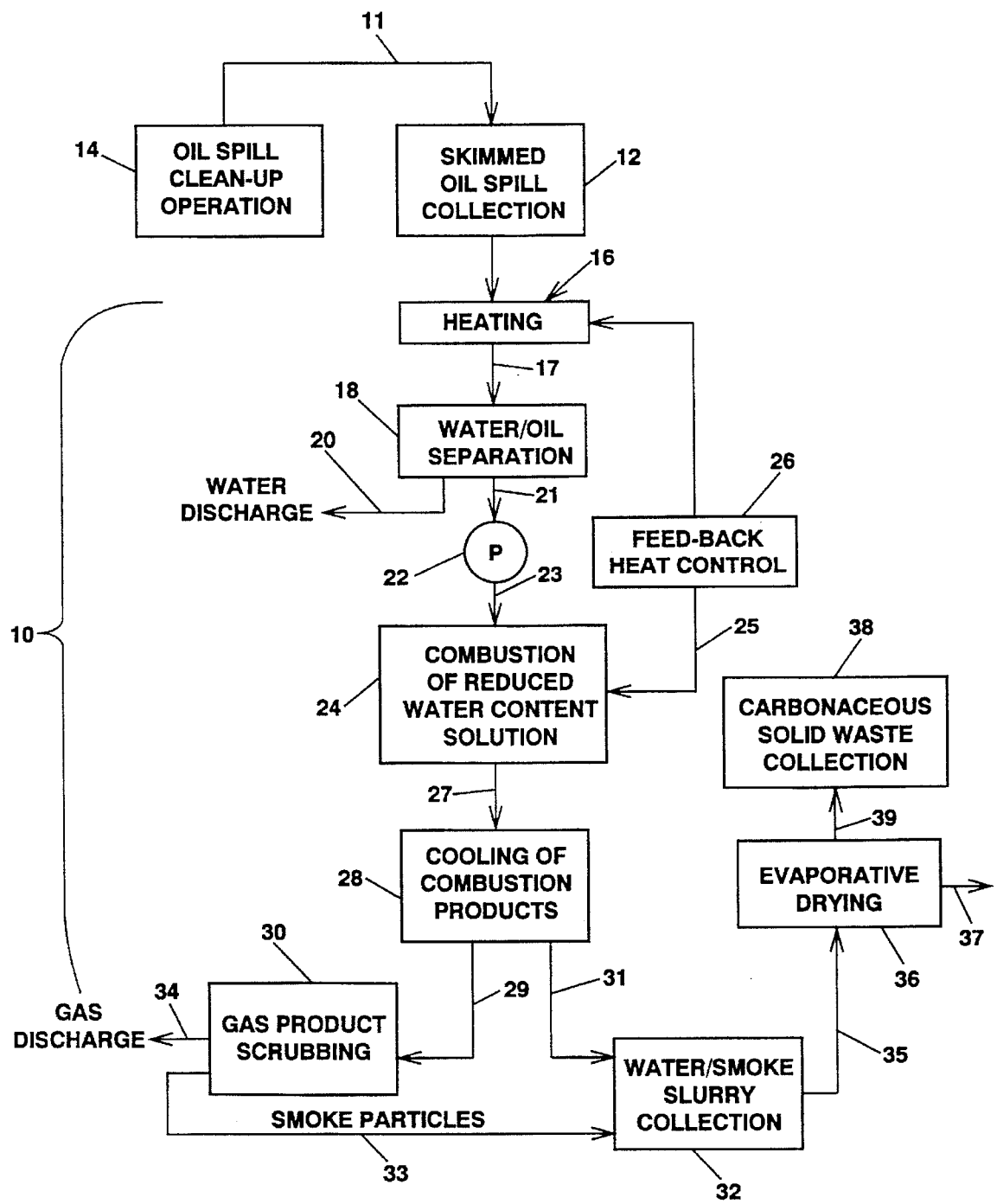

Referring now to the drawing in detail, FIG. 1 diagrams a method or process generally referred to by reference numeral 10, for disposal of a collection 12 of oil and water skimmed by a vessel during an oil spill cleanup operation 14. Such oil spill cleanup operation is performed at sea to remove the oil slick resulting from an oil spill incident. Generally, for each gallon of oil recovered by such cleanup operation and stored within a containment barge of the skimmer vessel, 9 gallons of water is also collected. Such a collection 12 of 10% oil and 90% water is disposed of rapidly and continuously in situ with minimized environmental pollution pursuant to the present invention.

As diagrammed in FIG. 1, the collection 12 of oil and water from the skimmed oil spill is initially increased in temperature by a heating step 16 to enhance a flow 17 of a resulting heated solution of the oil and the water through subsequent steps of the process 10. Thus, the heated solution of oil and water then undergoes a separation step 18 during which a quantity of oil-free water is separated and discharged into the seawater, as denoted by reference numeral 20. The water content of the heated solution of oil and water denoted as 21 following the separation step 18, is thereby reduced below 30 percent before being pressurized to approximately 3000 psi by a pump 22. Flow of the pressurized oil solution from the pump 22, denoted as 23 in FIG. 1, is fed to a combustion chamber within which a combustion step 24 is performed to burn and convert all of the oil solution into combustion products during recirculation flow within the combustion chamber. Such recirculation flow occurs at a rate determined by the aforementioned pressurization of the oil and water solution by pump 22 and its heating during step 16 to a regulated temperature interrelated with the combustion step 24 by a furnace temperature signal 25 generated through a feedback heat control step 26.

The burning of the oil and water solution during step 24 results in combustion products 27 which include smoke particles and water vapor which undergo cooling to a temperature less than 180° F. by means of the cooling step 28 as diagrammed in FIG. 1. Thus, both smoke 29 and a slurry of solid particles in water condensate 31 are produced, with the smoke 29 being fed through a gas scrubbing step 30, while the rest of the cooled combustion products form the slurry 31 that is stored as collection 32. The gas product or smoke cleansed by the scrubbing step 30 is then discharged to atmosphere as denoted by reference numeral 34, while solid smoke particles 33 are transferred to the slurry collection 32. The slurry 35 from collection 32 then undergoes an evaporative drying step 36 producing a discharge of water vapor 37 and solid carbonaceous waste 39 forming collection 38 to complete the process 10 as diagrammed in FIG. 1.

Figure 2:
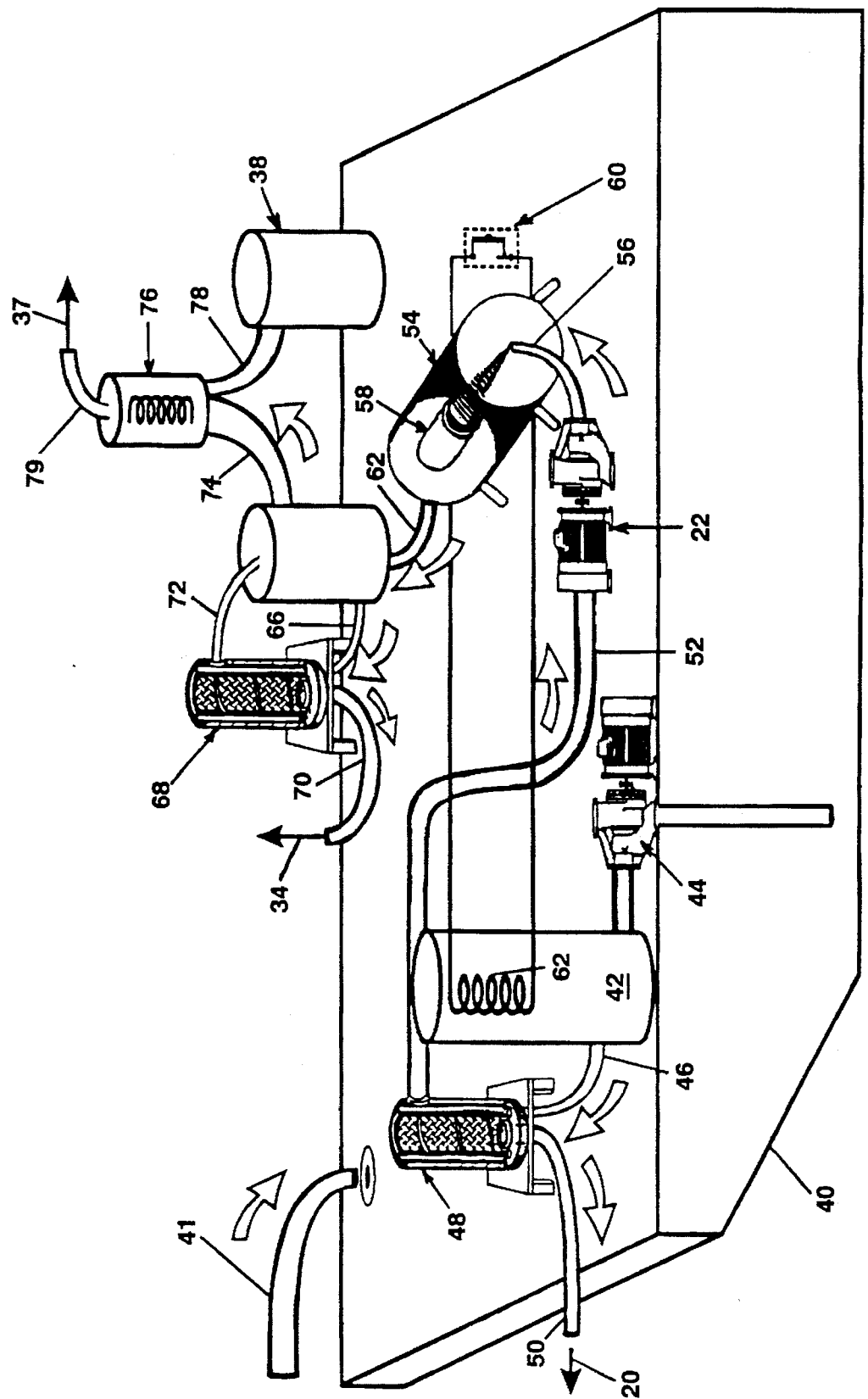

Apparatus components through which the oil and water disposal process 10 is performed are mounted within an oil spill mitigation barge 40 associated with the skimmer vessel as schematically illustrated in FIG. 2. The oil and water skimmed by the vessel is fed through a conduit 41 to the skimmer barge 40 to form the collection 12, having for example 5% oil in 95% salt water. The oil/water collection 12 is received and stored within the bottom of barge 40 as shown from which it is drawn into a heater tank 42 by means of a pump 44 in order to perform the heating step 16 aforementioned. The viscosity of the oil and water collection 12 is thereby reduced to allow it to be fed as an oil and water solution under pressure of the pump 44 through conduit 46 to a non-clogging, microfilter spinning type of oil and water separator 48 through which the water/oil separation step 18 is performed. The separated water 20 is accordingly discharged into the sea through conduit 50 while the rest of the oil/water solution, having a water content reduced to less than 30%, is delivered by conduit 52 to the pump 22 aforementioned in connection with FIG. 1. The pumps 22 and 44 may be of suitable well known types, such as a lubrication or fuel oil pump pressurizing the oil and water solution at 3000 psi for flow into an enclosed furnace housing 54 through an injection spray nozzle 56. Such pressurized and reduced water content solution is thereby fed to and undergoes recirculation flow within a combustion zone chamber 58 of the furnace in order to perform the combustion step 24 as hereinbefore described. The furnace housing 54 also has associated therewith a feedback control unit 60 electrically connected to a heating coil 62 within the heater tank 42, as diagrammed in FIG. 2, to perform the feedback heat control step 26 regulating the heating of the oil/water solution for establishing at an optimum temperature to prevent overheating and maintain sufficient flow for continuous combustion.

After the combustion step 24 is performed within the furnace housing 54, combustion products are fed therefrom through conduit 62 to a water wash down unit 64 of a currently available type within which the cooling step 28 is performed. Combustion gas cooled below 180° F. is then fed from the cool down unit 64 through conduit 66 to a non-clogging, spinning microfilter type of smoke scrubber device 68 within which the smoke scrubbing step 30 is performed. Cleansed smoke or combustion gas 34 is thereby discharged to atmosphere from the scrubber device 68 through conduit 70, while solid smoke particles are transferred by conduit 72 to the wash down unit 64 and added to the water/smoke slurry collection 32, which is then fed by conduit 74 to a dryer unit 76 within which the evaporative drying step 36 is performed. The collection 38 of carbonaceous solid waste is thereby received from the dryer unit 76 through conduit 78 while clean water vapor discharge 37 is vented to atmosphere through conduit 79 as shown in FIG. 2.

The apparatus components hereinbefore described for performance of the oil and water disposal method or process 10, are per se generally known in the art. The spinning microfilter type of separator 48 referred to, may alternatively be replaced by a currently available gravity type of separator, while the recirculation zone combustion chamber 58 may be replaced by any oil burning furnace preheated to a significantly high temperature. Obviously, other modifications and variations of the present invention may be possible in light of the teachings set forth herein. It is therefore to be understood that within the scope of the appended claims the invention may be practiced otherwise than as specifically described.

What is claimed is:

1. A method for disposal of a collection of oil and water, including the steps of: separating some of the water from said collection to form a solution of the oil having a reduced water content; burning said solution to form combustion products therefrom; cooling said combustion products to form smoke and a slurry of water condensate and solid particles; scrubbing the smoke to discharge a cleansed gas portion of the combustion products with remaining solid particles transferred to said slurry; and drying the slurry with the solid particles transferred thereto to form solid waste.

2. The method as defined in claim 1 wherein said collection of the oil and water is obtained by skimming seawater during oil spill cleanup operations.

3. The method as defined in claim 2 further including the step of: heating said collection of the oil and the water to enhance flow of the solution of the oil with the reduced water content.

4. The method as defined in claim 3 further including the steps of: regulating said flow of the solution of the oil by pressurization thereof above 3000 psi before said step of burning; and controlling said step of heating to lower the reduced water content of the solution below 30 percent by said step of separating.

5. The method as defined in claim 4 wherein the combustion products are lowered in temperature below 180° F. by said step of cooling.

6. The method as defined in claim 1 further including the step of: heating said collection of the oil and the water to enhance flow of the solution with the reduced water content.

7. The method as defined in claim 6 further including the steps of: regulating said flow of the solution by pressurization thereof and controlling increase in temperature thereof by said step of heating in accordance with feedback from said step of burning.

8. In combination with an oil spill cleanup operation through which seawater is skimmed to obtain a collection of oil and water, a method for disposal of said collection with reduced environmental pollution, comprising the steps of: heating the collection of the oil and the water; separating a quantity of the water from said collection after said heating thereof to obtain a solution with a reduced water content; discharging said quantity of the water into the seawater; burning the solution with the reduced water content to form combustion products therefrom; cooling the combustion products to form smoke and a slurry of water condensate and solid particles; scrubbing the smoke to form a cleansed gas portion of the combustion products and additional solid particles; discharging the cleansed gas portion to atmosphere; transferring the additional solid particles to the slurry; and drying the slurry with the additional solid particles transferred thereto to form solid waste to be disposed of.

9. The method as defined in claim 8, further including the steps of: pressurizing the solution for regulated flow between said steps of separating and burning; and regulating increase in temperature of the collection of the oil and the water by said step of heating through feedback control from said step of burning.

10. The method as defined in claim 9 wherein the solution is pressurized above 3000 psi by said step of pressurizing; and the reduced water content of the solution is below 30 percent.

11. The method as defined in claim 10 wherein the combustion products are lowered in temperature below 180° F. by said step of cooling.

* * * * *